Dec. 27, 1966     R. D. MULLEN     3,294,941
HEAT-RESPONSIVE ELECTRIC CABLE FORMED OF
HEAT SHRINKABLE MATERIAL
Filed Oct. 21, 1965

INVENTOR
Robert D. Mullen
BY
ATTORNEY

United States Patent Office 3,294,941
Patented Dec. 27, 1966

3,294,941
HEAT-RESPONSIVE ELECTRIC CABLE FORMED
OF HEAT SHRINKABLE MATERIAL
Robert D. Mullen, 7534 Wilbur Ave.,
Reseda, Calif. 91335
Filed Oct. 21, 1965, Ser. No. 499,414
5 Claims. (Cl. 200—143)

This invention relates generally to electrical cables which are heat-responsive for actuating fire alarm circuits, sprinkler circuits, and the like. More particularly, the invention consists of new and useful improvements in a heat-actuated electrical signal cable wherein the heat-responsive element is formed of a suitable heat shrinkable plastic material which, when exposed to heat of a specific elevated temperature, will cause contact between two associated electrical conductors.

Heretofore, efforts have been made to design heat-responsive cables for this same general purpose. For example, some conventional cables employ fusible metal which, upon the application of heat, completes an electric circuit. These conventional cables are relatively heavy and expensive because of the weight and cost of low temperature alloys, and, furthermore, they are usually stiff and unwieldy.

It is the primary object of the present invention to provide a light weight, flexible, heat-responsive cable which is relatively simple and inexpensive to manufacture and is reliable and fast-acting.

Another object of the invention is to provide a heat-responsive cable in the nature of a continuous switch employing conventional conductor wires, normally supported out of contact and embodying either an underlying or overlying element of heat shrinkable plastic material which extends throughout the entire length of the conductors, whereby the application of heat of a specific temperature at any point in the length of the cable, will cause the required contact of the conductors.

With the above and other objects in view which will appear as the description proceeds, the invention consists in the novel features herein set forth, illustrated in the accompanying drawings, and more particularly pointed out in the appended claims.

Referring to the drawings in which numerals of like character designate similar parts throughout the several views.

Figure 1A:
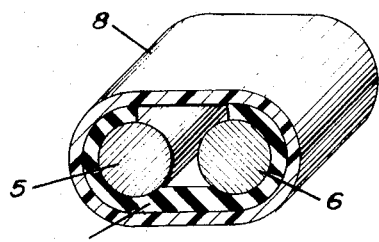
FIG. 1a is a perspective view partially in section, illustrating one form of the invention in inoperative position.

In the drawings, referring first to FIG. 1a, the numerals 5 and 6 represent any suitable uncovered conductor wires, partially enveloped in laterally spaced relation by an insulating strip 7. Preferably, the conductors 5 and 6 are cemented to the inner surface of the insulator 7, the partially overlying, opposed, longitudinal edges of which are laterally spaced throughout their length for the purpose hereinafter described.

Completely enveloping the conductors and insulator is a tube or sheath 8 of heat shrinkable, plastic material. Various materials possessing the characteristic of shrinking when exposed to heat of a predetermined temperature, are available on the market in tubular and other forms, such for example, as the following modified base polymers: polyolefin, polyvinylchloride, polyvinylidene fluoride, polytetrafluoroethylene, neoprene elastomer and silicone elastomer. Through the application of radiation chemistry to these specially formulated plastic and elastomeric compounds, the desired heat shrinkable characteristics have been brought about. An example of such treatment of plastic materials is described in the U.S. patent to Kirkpatrick et al., No. 3,093,448, issued June 11, 1963.

Figure 1B:
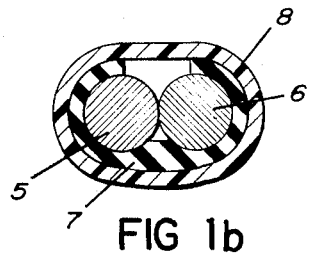
FIG. 1b is a sectional view illustrating the same structure in operative or circuit-closing position.

Thus, when the cable or continuous switch illustrated in FIG. 1a is subjected to heat of a predetermined temperature elevated at any point in its length, the sheath 8 through its "elastic memory" will contract peripherally and return to its original extruded or molded shape, as shown in FIG. 1b, causing the conductors 5 and 6 to make contact and energize an alarm or the like. The term "elevated temperature" is intended to mean any temperature above normal or room temperature, which occurs as the result of fire or excessive over-heating in a mechanical or electrical system.

Figure 2A:
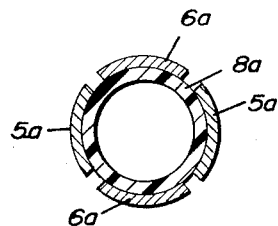
FIG. 2a illustrates a modified form of the invention.
Figure 2B:
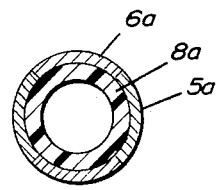
FIG. 2b illustrates the structure of FIG. 2a in circuit-closing position.

In the modified form of the invention shown in FIG. 2a, a series of segmental conductors 5a and 6a of arcuate cross-section, are cemented to the exterior surface of a tube 8a of heat shrinkable material. In this inoperative position, the longitudinal edges of adjacent conductors are respectively spaced and normally retained in spaced relation by the tube 8a. When subjected to heat, the tube 8a shrinks and causes the adjacent edges of the conductors 5a and 6a to complete electric contact, as shown in FIG. 2b.

Figure 3A:
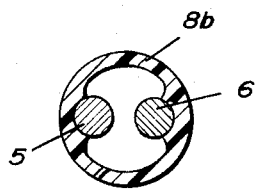
FIG. 3a is a further modification.
Figure 3B:
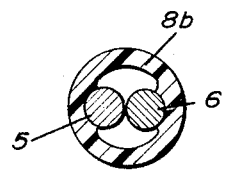
FIG. 3b illustrates the structure of FIG. 3a in circuit-closing position.

A still further modification of the invention is shown in FIG. 3a and embodies a tube 8b of heat shrinkable material, within the inner wall of which are molded, normally spaced conductors 5 and 6. Upon the application of heat at any point in the line, the tube 8b shrinks and causes the conductors 5 and 6 to contact, as shown in FIG. 3b.

Figure 4A:
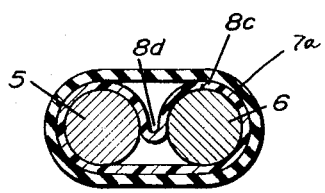
FIG. 4a illustrates a still further modification.
Figure 4B:
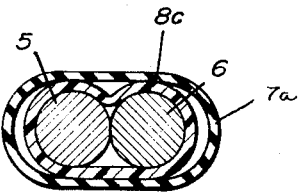
FIG. 4b illustrates the structure of FIG. 4a in circuit-closing position.

Another modification of the invention which operates on the same basic principle, is illustrated in FIGS. 4a and 4b. In this form, the conductor wires 5 and 6 are enclosed within a sleeve 8c of heat shrinkable plastic of a cross-sectional dimension normally greater than that of the enveloping cover 7a. Thus, as shown in FIG. 4a, the excess material of the sleeve 8c, when the latter is transversely collapsed and enclosed within the cover, provides an intervening longitudinal spacing fold 8d between the conductor wires 5 and 6 which normally prevents their contact. However, upon being subjected to heat of a predetermined temperature, the sleeve 8c shrinks, which withdraws the fold 8d from between the conductor wires and permits electrical contact, as shown in FIG. 4b.

While the foregoing description refers particularly to certain irradiated plastic materials, it is to be understood that the invention is not to be considered restricted in this respect. The spirit of the invention contemplates the use of any suitable plastic or other material having the property of shrinking when exposed to heat of a predetermined temperature.

From the foregoing, it is believed that the invention may be readily understood by those skilled in the art without further description, it being borne in mind that numerous changes may be made in the details disclosed without departing from the spirit of the invention as set forth in the following claims.

I claim:

1. A self-contained, heat-actuated, continuous electric switch for energizing the electric circuit of an alarm system or the like, comprising at least two uncovered, elongated conductors electrically connected in said circuit and normally disposed throughout their lengths in substantially parallel, laterally spaced, non-contacting relation, and a common, continuous, tube-like actuating element having portions extending longitudinally alongside of diametrically opposite peripheries of respective spaced conductors, said actuating element being formed of a material which is peripherally shrinkable under the influence of a predetermined elevated temperature, whereby, when said cable is subjected to such temperature at any point along its length, said actuating element peripherally contracts and said conductors are forced laterally into line contact with one another at said point to complete said electric circuit.

2. A continuous electric switch as claimed in claim 1, wherein said conductors comprise a plurality of continuous strips of electrical conducting material of arcuate cross-section, embracing the outer periphery of said tube-like actuating element, respective conductors being cemented to the outer periphery of said actuating element and normally maintained in spaced relation along their adjacent longitudinal edges, whereby, when said cable is subjected to elevated temperatures at any point in its length, said actuating element peripherally contracts at such point, causing the adjacent longitudinal edges of respective conductors to engage and make electrical contact.

3. A heat actuated electric cable as claimed in claim 1, including an insulator strip partially enveloping said spaced conductors with its opposite longitudinal edges in converging spaced relation, at least a portion of said actuating element embracing the spaced longitudinal edges of said insulator strip and bridging the space therebetween.

4. A heat actuated electric cable as claimed in claim 1, wherein said conductors are partially embedded in opposite interior walls of said element and normally maintained in laterally spaced relation thereby, whereby, when said cable is subjected to elevated temperatures, said tubular actuating element peripherally contracts, causing said conductors to make electrical contact.

5. A heat actuated electric cable as claimed in claim 1, wherein said actuating element comprises a sleeve of plastic material having heat shrinkable characteristics, said sleeve enveloping said conductors in laterally spaced relation, and a casing enveloping said sleeve, said sleeve having a normal cross-sectional dimension greater than that of said casing and being normally, transversely collapsed in the latter to provide a longitudinal spacing fold of heat shrinkable material between said spaced conductors, whereby, when said cable is subjected to heat, said sleeve contracts laterally, withdrawing said spacing fold from between said conductors, forcing said conductors laterally into line contact.

References Cited by the Examiner

UNITED STATES PATENTS

| | | | |
|---|---|---|---|
| 1,904,418 | 4/1933 | Dantsizen | 174—113 X |
| 2,744,981 | 5/1956 | Spears | 200—113 |
| 2,988,618 | 6/1961 | Houser | 200—122 |
| 3,093,448 | 6/1963 | Kirkpatrick et al. | 174—110 |
| 3,206,539 | 9/1965 | Kelly | 174—117 X |

FOREIGN PATENTS

| | | |
|---|---|---|
| 465,069 | 4/1937 | Great Britain. |
| 966,167 | 6/1965 | Great Britain. |

BERNARD A. GILHEANY, *Primary Examiner.*

H. GILSON, *Assistant Examiner.*